ated Jan. 28, 1969

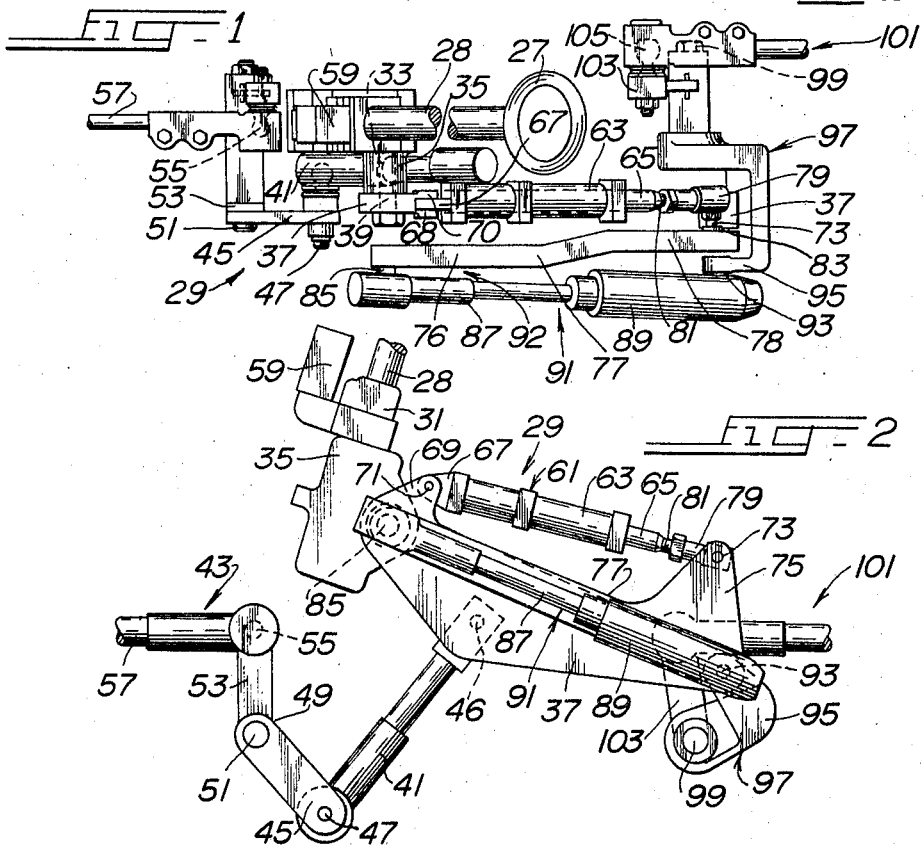
Fig. 1
Fig. 2
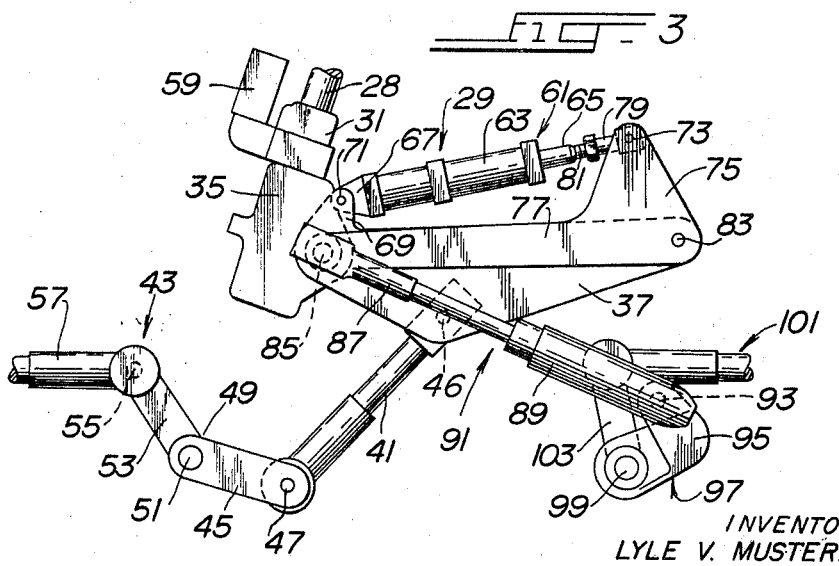
Fig. 3
INVENTORS.
LYLE V. MUSTERED
G. DOUGLAS SIMONDS

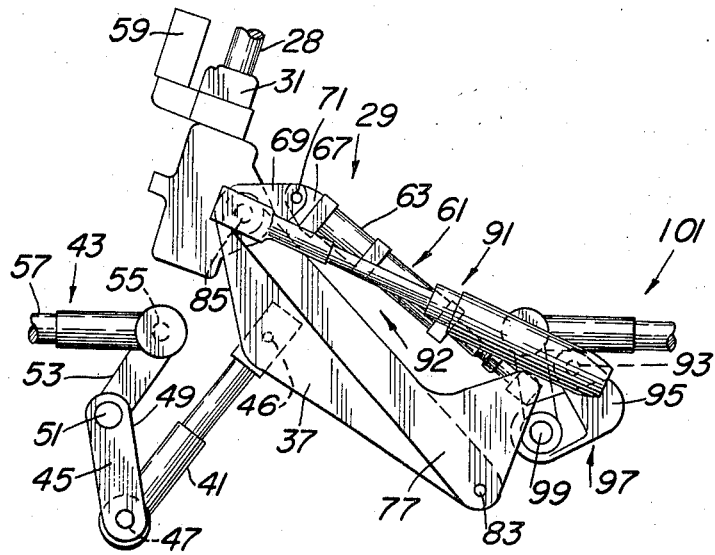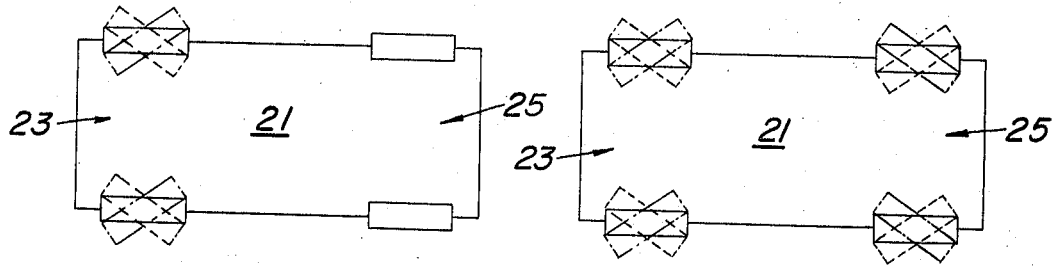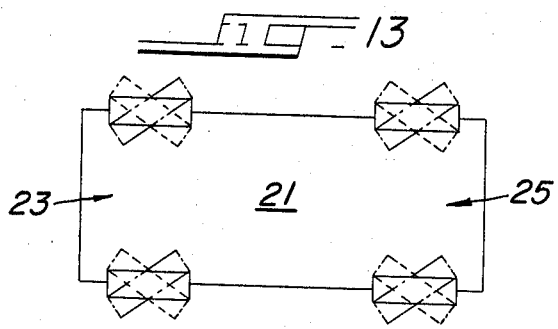

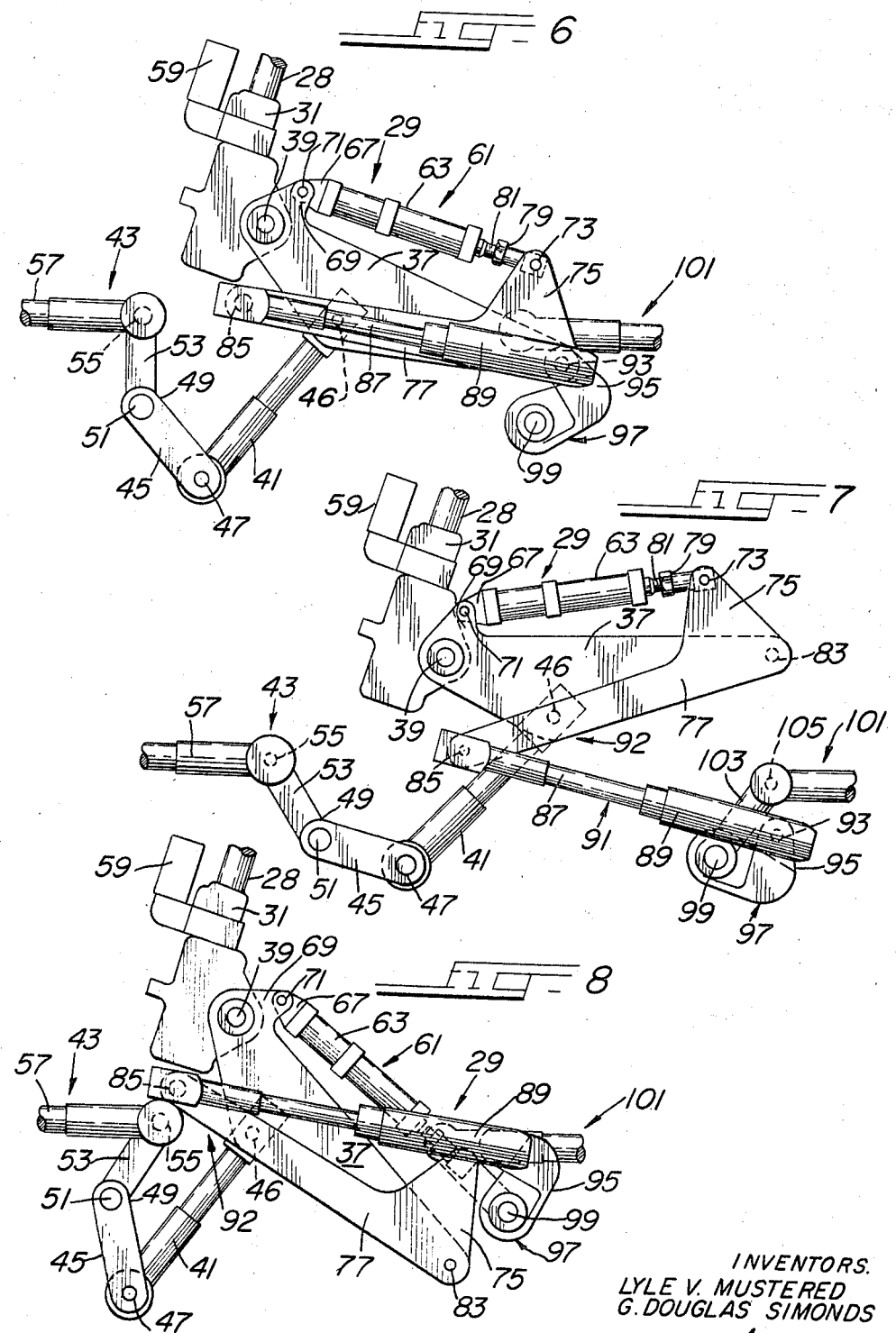

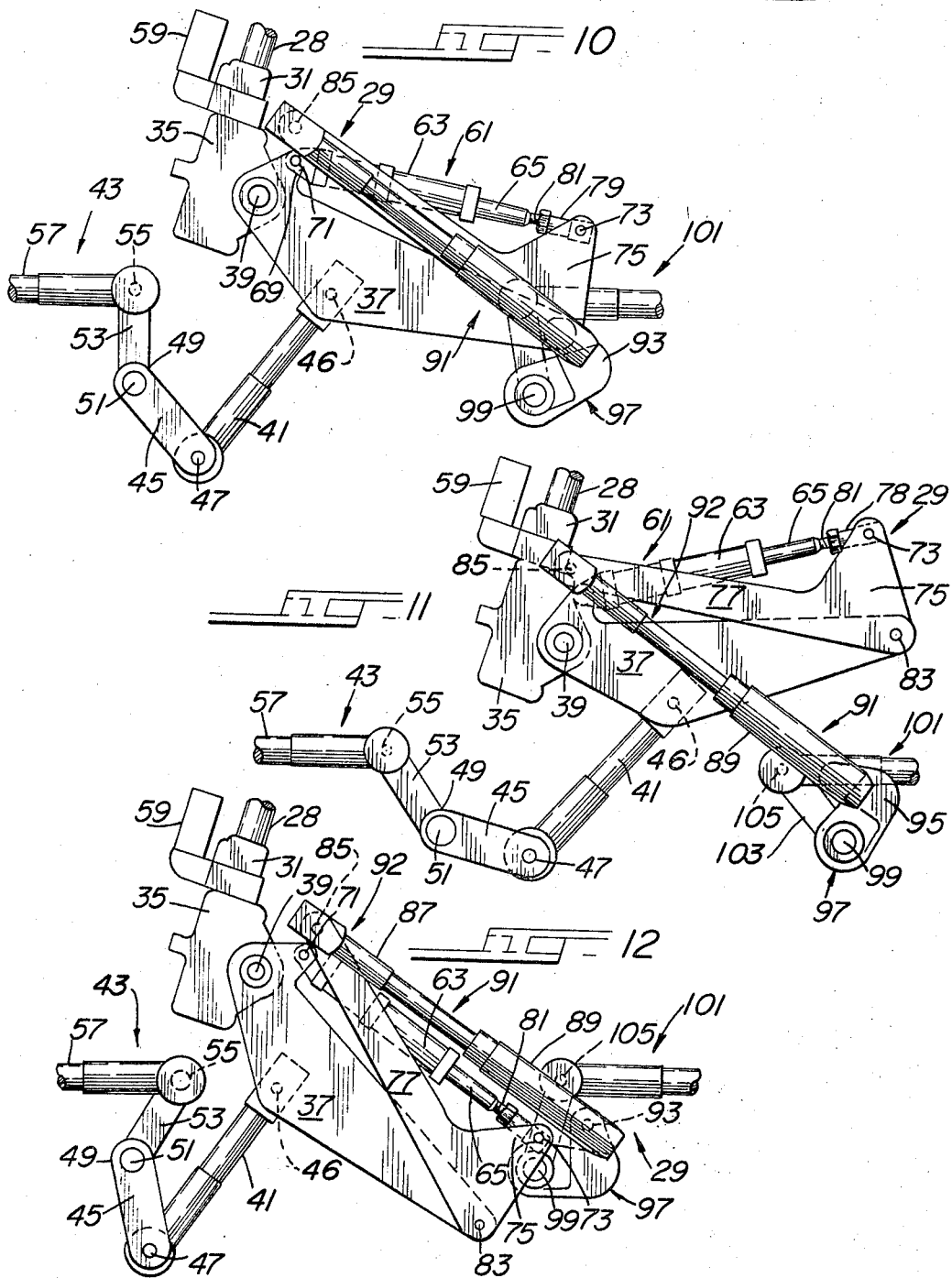

3,424,023
STEERING CONTROL SYSTEM
Lyle V. Mustered, Streator, Ill., and George D. Simonds, Clintonville, Wis., assignors to Anthony Company, Streator, Ill., a corporation of Illinois
Filed Apr. 27, 1966, Ser. No. 545,667
U.S. Cl. 74—471
Int. Cl. G05g 9/00, 13/00
10 Claims

ABSTRACT OF THE DISCLOSURE

A steering means for wheeled vehicles having mechanisms for selective steering control of both the front and rear vehicular wheels from a front wheel steering control member whereby steering torque can be transferred to such front and rear wheels to turn them simultaneously through equal angles in the same and opposite directions to effect crab and cramp steering.

---

The present invention relates to steering means for wheeled vehicles. Particularly the invention regards mechanisms for steering control of front and rear vehicular wheels. Specifically the invention concerns apparatus for selective steering control of rear vehicle wheels operated by front wheel steering control means.

Vehicles of the class with which the present invention concerns itself are intended for operation with their front and rear wheels arranged in selected of three different general steering settings as follows: (1) neutral—a condition in which rear wheels are passively controlled, i.e., adapted to "follow" associated positively controlled front wheels upon vehicular operation; (2) cramp—a condition in which rear wheels are disposed relative to longitudinal vehicular axis at angle equal to but opposite to the angular disposition of associated front wheels, and (3) crab—a condition in which front and rear wheels are disposed relative to their longitiudinal vehicular axis at equal angles and in the same direction. While it may be unnecessary during vehicular operation to exercise positive steering control over rear wheels when they are conditioned neutral, management of rear wheels is required during vehicle operation for cramp and crab conditions to maintain desired wheel attitudes.

Heretofore known vehicles of the indicated class are steered by mechanical apparatus through which front wheels as well as rear wheels may be managed by a single steering mechanism controlled by an operator from one operating station. Such steering apparatus permit selective steering control of front wheels alone for neutral condition and front and rear wheels simultaneously for cramp and crab conditions. However, to shift prior steering devices for alternate requirements or for elected types of wheel control requires great strength. Moreover, the character and arrangement of the components comprising such prior devices are such that they readily rust to create thereby associated problems of maintenance and operation.

It is an object of the present invention to provide an improved mechanism for selective steering control of rear vehicular wheels simultaneously with their front wheels.

It is another object of the invention to provide improved means or cramp and crab steering of wheeled vehicles.

It is a further object of the invention to provide an improved mechanism for selectively connecting rear vehicle wheels to a front wheel steering control member whereby the rear wheels may be selectively controlled with associated front wheels.

It is an additional object of the present invention to provide an improved mechanism for connecting to and releasing rear vehicular wheels from a front wheel steering control member whereby steering torque can be transferred to such front and rear wheels to turn them simultaneously through equal angles in the same and opposite directions to affect crab and cramp steering.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a plan view of a steering control mechanism for wheeled vehicles and embodying the present invention, parts being broken away to conserve drawing area;

FIGS. 2–4, inclusive, are similar side elevational views showing said control mechanism in neutral setting and arranged: in FIG. 2 to position front vehicle wheels straight; in FIG. 3 for a left turn attitude of front vehicle wheels, and in FIG. 4 for a right turn attitude of front vehicle wheels;

FIG. 5 is a schematic view in plan illustrating in solid, phantom and dotted lines the respective attitudes of vehicle wheels corresponding to the control mechanism arrangements in FIGS. 2–4, inclusive;

FIGS. 6–8, inclusive, are side elevational views similar to FIGS. 2, 3 and 4, respectively, but showing said control mechanism set for cramp steering and arranged: in FIG. 6 to position vehicle wheels straight; in FIG. 7 for a left turn attitude of the vehicular steering wheel, and in FIG. 8 for a right turn attitude of the vehicular steering wheel;

FIG. 9 is a view similar to FIG. 5 but illustrating in solid, phantom and dotted lines the respective attitudes of vehicular wheels corresponding to the control mechanism arrangements shown in FIGS. 6–8, inclusive;

FIGS. 10–12, inclusive, are side elevational views similar to FIGS. 2, 3 and 4 and FIGS. 6, 7 and 8, respectively, but showing said control mechanism set for crab steering and arranged: in FIG. 10 to position vehicle wheels straight; in FIG. 11 for a left turn attitude of the vehicular steering wheel, and in FIG. 12 for a right turn attitude of the vehicular steering wheel; and FIG. 13 is a view similar to FIGS. 5 and 9 but illustrating in solid, phantom and dotted lines the respective attitudes of vehicular wheels corresponding to the control mechanism arrangements shown in FIGS. 10–12, inclusive.

Referring now more particularly to the drawings, in FIGS. 5, 9 and 13 there is seen what may be a self powered vehicle 21, such as a tractor, lift truck, or other heavy duty vehicle, carried in a conventional manner on a plurality of vehicle wheels arranged as a front wheel assembly 23 and a rear wheel assembly 25. In the present embodiment, the rear wheel assembly 25, when conditioned as in FIG. 5, cannot be positively controlled for steering said vehicle but serves as an idler or follower in a course determined by the front wheel assembly 23 as the vehicle 21 moves. The front wheel assembly however may be manually controlled for full normal range of left-right turning (phantom and dotted lines, respectively in FIG. 5) from an operator's station on the vehicle by a conventional steering wheel 27 which is carried atop an upwardly projecting steering column 28. A steering control mechanism generally designated 29 and presently to be described in detail is characterized as being in "neutral" setting when the assembly 23 but not the assembly 25 can be controlled by the steering wheel 27.

As illustrated in FIGS. 1–4, 6–8 and 10–12, inclusive, steering wheel management of the steering control mechanism 29 is effectuated through a conventional housed steering gear 31 which is arranged at the lower end of the steering column 28 and connected for rotation with the steering wheel 27. A shaft 33 (FIG. 1) which is disposed transversely to column 28, is operably associated with a housed gear transmission 35. The latter is arranged, for rotation by the gear 31 to impress its torque on said shaft 33. The shaft 33 has an extension 39 which projects outwardly from the housing of transmission 35 and defines a fixed axis of rotation.

A pitman 37 at one end portion is splined or otherwise rigidly connected to said shaft extension 39 and extends normally thereto. In the present embodiment the parts are arranged so that the pitman 37 will rock counterclockwise and clockwise with respect to the side elevational views when the steering wheel is rotating for left and right vehicle turns, respectively. Moreover, the pitman is arranged with respect to such views so that as the pitman moves upwardly and downwardly, respectively, it rocks counterclockwise and clockwise.

An upper end portion of a forwardly sloping downwardly projecting end link or arm 41 of a front steering linkage generally designated 43 is pivotally connected to the pitman as at 46. The lower end of said arm 41 is connected by a movable pivot 47 to the downwardly projecting extension 45 of a bell crank construction 49 which comprises said steering linkage 43. The bell crank construction 49 is rockable on a fixed pivot 51 which defines an axis disposed below and preferably parallel to the shaft extension 39. The bell crank construction 49 has an upper extension 53 which is pivotally connected by a movable pivot 55 to the rear end portion of a forwardly projecting link 57 in a manner such that as the steering wheel 27 turns to the left and to the right, the link 57 will be motivated respectively forwardly and rearwardly, that is, toward the left and toward the right when considered from the side elevational views herein. The link 57 is operably connected at its forward end portion to the front steering assembly 23 by means (not shown) which may be conventional and in a manner such that as said link 57 moves forwardly, the wheels of the assembly 23 will turn toward the left (phantom lines, FIGS. 5, 9 and 13) and when the link 57 moves rearwardly, the wheels of the front wheel assembly 23 will turn toward the right (dotted lines in FIGS. 5, 9 and 13).

In FIGS. 2, 6 and 10, the various conditions of the front steering linkage 43 and of the pitman 37 are shown for a straight ahead attitude of the wheels of assembly 23 (solid lines, FIGS. 5, 9 and 13) under conditions in which respectively, the rear wheels are not actively controlled by the control mechanism 29, are controlled in cramp association with the front wheels and controlled in crab association with the front wheels. The manner in and the means by which the various relationships of the front and rear wheel assemblies are determined will be described presently. In FIGS. 3, 7 and 11, various conditions of the front steering linkage 43 and the pitman 37 are shown when the front wheel assembly is arranged in a left turn attitude and in the neutral, cramp and crab associations, respectively, with the rear wheel assembly. Various conditions of the front steering linkage 43 and the pitman 37 for a right turn attitude of the front wheel assembly are shown in FIGS. 4, 8 and 12, respectively, for neutral, cramp and crab associations of the front and rear wheel assemblies.

The mechanical means which have heretofore been described in connection with steering operation and control of the front wheel assembly 23 may comprise what is referred to as a mechanical follow-up for a hydraulic steering system. While the present invention is not limited by such dual steering means, there is shown in the drawings a front steering valve 59 which is controlled by the steering wheel 27. Valve 59 is operably arranged for hydraulic steering control of the front wheel assembly 23 by suitable means (not shown), which may be conventional.

The condition of an hydraulic cylinder construction generally designated 61 determines the character of the relationship or association between the front and rear wheel assemblies 23 and 25. As illustrated, the hydraulic cylinder construction 61 comprises a cylindrical body 63 and a hydraulically reciprocated piston rod 65 which is projectable in the illustrated embodiment, to various settings from the rear end of the body 63. A mounting member 67 rigid with the forward end of the body 63 connects the cylinder construction 61 by means of a pivotal connector 71 to boss means 69. As illustrated in FIG. 1, boss means 69 comprises a pair of spaced apart ears 68 and 70 extending upwardly from and integral with an upper forward portion of the pitman 37 which is disposed proximate shaft extension 39.

An upwardly projecting forward mounting extension 75 of an arm 77 pivotally connects as at 73 to the opposite end of the cylinder construction 61. The latter connection is effected by adjustable connector means having a threaded end 79 which is mounted on an outer or rear threaded end portion 81 of the piston rod 65. Thereby, the length of said piston rod 65 may be adjusted. As perhaps best illustrated in FIG. 7, the arm 77 has a configuration in the nature of a bell crank which at its rear or outer end portion is connected by a movable pivot 83 to the outer or rear end portion of the pitman 37, said arm being disposed to one side and longitudinally of said pitman.

By means of a movable pivot 85, the inner or forward connector end of a stem 87 is connected to the inner or forward end portion of said arm 77. The stem 87 together with a valved body 89 define an elongated valve construction 91 which serves as a force transmission member in the nature of an arm. The latter construction is aligned to one side of the arm 77 relative to which said construction is longitudinally disposed and with said construction functions as a toggle joint 92 having a knee 85, as will be apparent from the ensuing description.

An upper extension 95 of a transversely extending crank assembly 97 is connected to the rear end of valve construction 91 by means of a moving pivot 93. Upon lineal displacement of the valve construction 91, the crank assembly 97 rocks responsively. A fixed pivot 99 defines an axis of rotation for said crank assembly and said pivot 99 is disposed below and parallel to the axis defined by the shaft extension 39.

The valve construction 91 is arranged for slight extension and contraction and also for rocking movement in a plane which is substantially parallel to the plane in which pitman 37 is rockable. By referring to FIG. 1, it is seen that the arm 77 is disposed between said valve construction and said pitman. Moreover, it is observed that said arm 77 has oppositely bent or offset end sections 76 and 78 to facilitate connection thereof to the spaced apart valve construction and pitman, as aforesaid.

An upwardly extending end member 103 of the crank assembly 97 is pivotally connected as at 105 to the forward end portion of a mechanical rear steering linkage 101. The crank assembly 97 is arranged in a manner such that when the valve construction 91 moves to the right and to the left with respect to the elevational views the former will rock clockwise and counterclockwise, respectively. Simultaneously, the rear steering linkage 101 will correspondingly move rearwardly and forwardly.

At its rear end portion, the rear steering linkage 101 is operably connected by suitable means (not shown) to the wheel assembly 25 in a manner such that as the linkage 101 moves to the right and the left with respect to said elevational views, that is rearwardly and forwardly, the wheels comprising the rear assembly 24 will accordingly turn to the right and to the left, respectively. In FIGS. 7 and 12, the rear steering linkage is conditioned in a manner corresponding to a right turn attitude of the rear wheel assembly (FIG. 9 in phantom lines and FIG. 13 in dotted lines). In FIGS. 8 and 11 said rear linkage is conditioned for a left turn attitude of the rear wheel assembly (FIG. 9 in dotted lines and FIG. 13 in phantom lines).

In the instant embodiment the rear steering linkage 101 is also a mechanical follow-up to a hydraulic rear wheel steering system. This plural steering feature while shown in the drawings is not critical to the invention. Nevertheless, it is observed that the character of the valve construction 91 is such that when a linear force is impressed on the valve stem 87 longitudinally thereof, it will move slightly into or out of the valve body 89 to cause flow of hydraulic fluid to effectuate hydraulic steering movement of the rear wheel assembly 25 in direction corresponding to the direction to which the assembly 25 will be motivated by rear steering linkage 101.

In accordance with the present invention, the piston rod 65 is adapted to be hydraulically locked at three different positions which provide three different rod extensions relative to body 63. A three position cylinder construction of the type described is disclosed in copending application, Ser. No. 538,798, filed Mar. 30, 1966, and now abandoned. What is referred to as the medial rod position sets the control mechanism 29 in "neutral" in the illustrated embodiment (FIGS. 1-5, inclusive). The effective lengths of the pitman 37 and the arm 77 are such that when said piston rod 65 is locked in its neutral position the axes defined by the shaft extension 39 and the pivot 85 are coincident and are parallel to the axis defined by the fixed pivot 99. Under such conditions when the pitman 37 rocks in either direction, the arm 77 will also rock together with said pitman, the movement being about the then common axis. Under such condition no force will be impressed on pivot 85 or transmitted to valve construction 91. Accordingly, from the position of FIG. 2, the steering control mechanism 29 may be actuated to turn the front wheel assembly 23 to the left (FIG. 3 and phantom lines in FIG. 5) or to the right (FIG. 4 and dotted lines in FIG. 5) without affecting the rear steering linkage 101 which will remain in neutral or unconditioned for positive control of rear wheel assembly 25.

To set the steering control mechanism 29 for cramp steering, the piston rod 65 is conditioned in its withdrawn or retracted position (FIGS. 6-9, inclusive). Assuming that such condition ensues from the condition of FIG. 2, the toggle joint 92 will be caused to rock counterclockwise about the axis provided by the pivot 83 until the position of FIG. 6 is attained as a result of the shortening of said piston rod. The arm 77 and the valve construction 91 are proportioned in a manner such that the axes of pivots 83 and 93 are coincident when conditioned as in FIG. 2. Accordingly, downward or counterclockwise movement caused by the shortening or retraction of the piston rod 65 when the front wheels are straight ahead, as in FIG. 2, will cause toggle joint 92 to rock about said coincident axes of pivots 83 and 93 but will not produce a lineal force on the pivot 93. Accordingly, the assembly 101 will retain its neutral position.

However, upon rocking the pitman 37 upwardly from the position of FIG. 6 to the position of FIG. 7 to effect left turning of the wheels of assembly 23 (phantom lines, FIG. 9), a force will be generated causing arm 77 to rock counterclockwise around the pivot 83 as said last pivot is disaligned from pivot 93. Thereupon, a lineal force will be produced in toggle joint 92 and valve construction 91 will be urged to the right with respect to the elevational views to extend the rear wheel steering linkage 101 rearwardly and turn the wheels of the rear assembly 25 to the right (phantom lines, FIG. 9). The arrangement of the steering control assembly 29 for a right turn attitude of the front wheel assembly when in cramp association with the rear wheel assembly is shown in FIG. 8. To attain the condition of FIG. 8, the pitman 37 has rocked clockwise about the shaft extension 39 from the position of FIG. 6. As a result, the pivots 83 and 93 have become disaligned and the toggle 92 has rocked clockwise about pivot 83. Thereupon, a lineal force is impressed upon pivot 85, through which a forward vector is exerted on pivot 93.

Thereby, the rear steering linkage 101 is caused to move to the left from the position of FIG. 6 and the rear wheel assembly 25 will assume a left turn attitude (dotted lines FIG. 9).

It is appreciated that during cramp steering the torque causing movement of the rear wheel assembly will be the same as the torque causing the front wheel assembly to turn. Accordingly, front and rear wheel assemblies can always be disposed in predetermined angular relationship, correspondingly reversed. It is further observed that cramp steering in the present embodiment occurs when pivot 85 is disposed below the axis defined by shaft extension 39 and the axes of pivots 83 and 93 are disaligned to condition the toggle joint 92 for linear force transmission when the pitman is rocked.

In the present embodiment, disalignment which results in placing the pivot 85 above the shaft extension 39 sets the steering control mechanism 29 for crab steering (FIGS. 10-13, inclusive). Such setting is achieved by condiitoning the piston rod 65 in its most extended position. Piston rod movement to the position of FIG. 10 from the position of FIG. 2 causes clockwise rotation of the toggle joint 92 about the coincident axes of pivots 83 and 93, and accordingly, there will be no lineal force on the pivot 93. Consequently, rear wheel assembly 25 will then be in neutral position. However, upon rotation of the pitman 37 about its axis counterclockwise and clockwise from the position of FIG. 10 to the positions of FIGS. 11 and 12, forces will be impressed upon the pivot 93 to move it to the left and to the right, respectively, with respect to the elevational views. Accordingly, the wheels of the rear assembly 25 (FIG. 13) will be turned in the same direction as the wheels of the front assembly.

As in the case of cramp steering, the force transmitted to the pivot 93 during crab steering association will be proportional to the angular displacement of the pitman 37 from its front wheel straight position. The relation and proportion of parts is such that the wheels of the rear assembly will be turned to angular settings which are the same a sthe angular settings of the front wheels. In the present embodiment, to effect crab steering, the front and rear steering linkages move in the same directions simultaneosuly.

It is noted that the precise arrangement of the components of the steering control mechanism shown is not limiting on the invention inasmuch as other arrangements will be evident. That is significant is that in order to effectuate positive control of the rear wheel assembly 25 the axes of the pivot 85 and shaft extension 39 must be disaligned as well as the axes of pivots 83 and 93.

It is believed that our invention, its mode of construction and assembly, and many of its advantages should be readily understood from the foregoing without further description, and it should also be manifest that while a preferred embodiment of the invention has been shown and described for illustrative purposes, the structural details are nonetheless capable of wide variation within the purview of our invention as defined in the appended claims.

We claim:

1. In a wheeled vehicle having front and rear wheel assemblies mounted for guiding vehicular support, steering means arranged on said vehicle and adapted for operator management, a torque transmission mechanism operably connected to one of said wheel assemblies for steering control thereof by said steering means and linkage means arranged for lineal force transmission to effect steering control of the other wheel assembly by said steering means, the improvement comprising means defining a toggle joint connected to said torque transmission mechanism for motivating said linkage means, and adjusting means for conditioning the toggle joint actively and passively for force transmission to said linkage means for selective positive steering control of the wheel assemblies simultaneously, in which said toggle joint has a pair of pivotally connected together sections, said sections pivotally connected to said torque transmission mechanism and said linkage means, respectively, and adapted for selective over center conditioning for lineal force transmission whereby said linkage can be actuated by said steering means to operate said other wheel assembly.

2. A device as defined in claim 1 in which the torque transmission mechanism is rockably mounted, the adjusting means being connected to one of said toggle joint sections for selectively moving the knee of said toggle joint into and out of alignment with the rocking axis of said torque transmission mechanism whereby said toggle joint is selectively conditioned for conversion of torque of said torque transmission mechanism into a lineal force for motivation of said linkage means.

3. In a wheeled vehicle having front and rear wheel assemblies mountd for guiding vehicular support, steering means aranged on said vehicle and adapted for operator management, a torque transmission mechanism operably connected to one of said wheel assemblies for steering control thereof by said steering means and linkage means arranged for lineal force transmission to effect steering control of the other wheel assembly by said steering means, the improvement comprising means defining a toggle joint connected to said torque transmission mechanism for motivating said linkage means, and adjusting means for conditioning the toggle joint actively and passively for force transmission to said linkage means for selective positive steering control of the wheel assemblies simultaneously, in which the adjusting means comprises a toggle joint rocking member to selectively condition said toggle joint to generate lineal forces as said torque transmission mechanism is actuated, said toggle joint rocking member being an hydraulic assembly having a pair of telescopically arranged parts, said parts connected respectively to said torque transmission mechanism and a section of said toggle joint so that upon adjustment of said hydraulic assembly the toggle joint shifts into and out of force transmission association with said linkage means.

4. In a wheeled vehicle having front and rear wheel assemblies mounted for guiding vehicular support, steering means aranged on said vehicle and adapted for operator management, a torque transmission mechanism operably connected to one of said wheel asemblies for steering control thereof by said steering means and linkage means arranged for lineal force transmission to effect steering control of the other wheel assembly by said steering means, the improvement comprising means defining a toggle joint connected to said torque transmission mechanism for motivating said linkage means, and adjusting means for conditioning the toggle joint actively and passively for force transmission to said linkage means for selective positive steering control of the wheel assemblies simultaneously, in which the torque transmission mechanism comprises an arm having an outer end portion and an inner end portion rockably connected to said steering means, a fixed pivot defining a rocking axis about which said arm is rockable by said steering means, said toggle joint having a pair of sections, each thereof having an outer end portion and an inner end portion, the inner end portions of the toggle joint sections pivotally connected together, means defining a movable pivot connecting said toggle joint sections together, the outer end portions of said toggle joint sections pivotally connected respectively to the outer end portion of said arm and said linkage means for selective transmission of torque from the former as a lineal force to the latter, the one of said toggle joint sections having a part connected to the adjusting means for selectively aligning and disaligning the fixed and the movable pivots to selectively condition the toggle joint for conversion of torque of the arm to a lineal force to motivate said linkage means.

5. In a wheeled vehicle having front and rear wheel assemblies mounted for guiding vehiclular support, steering means arranged on said vehicle and adapted for operator control, a torque transmission mechanism operably connected to one of said wheel assemblies for steering control by said steering means, linkage means arranged for steering control of the other wheel assembly by said steering means, a first arm rockable about a fixed axis arranged for movement with said steering means to motivate said torque transmission mechanisim, force translation means rockable by said first arm and arranged for selective transmission of the torque of said first arm as a reversible lineal force to said linkeage means for crab and cramp steering of the other wheel assembly, and three position hydraulic means mounted for conditioning said force translation means for active and passive response to the torque of said first arm whereby the wheel assemblies may be selectively conditioned at two positions of said hydraulic means for simultaneous control by said steering means.

6. A device as defined in claim 5 in which the hydraulic means comprises a cylinder and a piston extendable to three stations from one end of said cylinder and proportioned to move the force translation means to a pair of opposed stations relative to said fixed axis to effect positive reversible control over the other wheel assembly.

7. A device as defined in claim 6 in which the cylinder is pivotally connected to said first arm and the piston is pivotally connected to said force translation means whereby said first arm and said force translation means can be held in preselected relationship as the steering means operates said first arm.

8. A device as defined in claim 5 in which the force translation means comprises a lineal force translation means comprises a lineal force transmission member arranged for rocking about a second fixed axis to motivate said linkage means in opposite directions and a second arm having one end portion pivotally connected to said lineal force transmission member and another end portion pivotally connected to said first arm, said second arm being arranged and proportioned for translation of the torque of said first arm as a lineal force only at predetermined angular relationships of said arms to thereby selectively positively control the wheel assemblies simultaneously only at predetermined positions of said hydraulic means.

9. Steering apparatus for a vehicle having front and rear wheel assemblies mounted for guiding support of said vehicle in reponse to lineally applied force comprising a steering wheel assembly arranged on said vehicle for operator control, a rockable torque transmission mechanism operably connected to said steering wheel assembly for steering control of said front wheel assembly, linkage means arranged for selective steering control of said rear wheel assembly by said steering wheel assembly, a force translation section pivotally connected to said torque transmission mechanism and arranged for rocking in a plane parallel to the plane of rocking of said torque transmission mechanism for motivating said linkage means, said section arranged and proportioned to impress the rocking force of said torque transmission mechanism on said linkage means only at select angular relationships of said torque transmission mechanism and said force translation section, and adjusting means for setting said torque transmission mechanism and said force translation section at selected angular relationships thereby to effect active steering control of the front and rear wheel assemblies simultaneously.

10. The steering apparatus of claim 9 in which said force translation section comprises a crank assembly connected at one end to said linkage means and rockable about a fixed axis, a first arm pivotally connected at one end thereof to the opposite end of said crank assembly, a second arm pivotally connected adjacent one end thereof to said torque transmission mechanism, and pivot means connecting together the opposite ends of said first and second arms to provide a movable pivot point therebetween, said adjusting means being pivotally connected to said second arm adjacent said one end thereof for adjusting the position of said movable pivot point with relation to said torque transmission mechanism.

References Cited

UNITED STATES PATENTS 3,198,541   8/1965   Christenson et al. _____ 280—91

HALL C. COE, *Primary Examiner.*

U.S. Cl. X.R.

180—77; 280—91